United States Patent
Shimamto et al.

(10) Patent No.: US 7,095,332 B2
(45) Date of Patent: Aug. 22, 2006

(54) ALARM DEVICE

(75) Inventors: Hiroshi Shimamto, Kyoto (JP); Yoshiyuki Otsuki, Kyoto (JP)

(73) Assignee: Omron Corporation, Kyoto (JP)

( * ) Notice: Subject to any disclaimer, the term of this patent is extended or adjusted under 35 U.S.C. 154(b) by 272 days.

(21) Appl. No.: 10/727,048

(22) Filed: Dec. 4, 2003

(65) Prior Publication Data
US 2004/0189482 A1 Sep. 30, 2004

(30) Foreign Application Priority Data
Dec. 6, 2002 (JP) .......................... P2002-355098

(51) Int. Cl.
*G08B 21/00* (2006.01)
*B60R 25/10* (2006.01)
(52) U.S. Cl. .............. 340/686.1; 340/693.9; 340/426.1; 340/426.24; 340/429; 340/440
(58) Field of Classification Search ............. 340/686.1, 340/426.24, 426.27, 426.34
See application file for complete search history.

(56) References Cited

U.S. PATENT DOCUMENTS 4,864,288 A * 9/1989 Cross ........................ 340/669
5,463,371 A * 10/1995 Fuller .................... 340/426.27
5,920,046 A * 7/1999 Takagi ..................... 200/61.48
D494,080 S * 8/2004 Takeuchi et al. ........... D10/106

FOREIGN PATENT DOCUMENTS

JP     P2000-285328 A    10/2000
JP     P2001-248323 A     9/2001

OTHER PUBLICATIONS http://www52.tok2.com/home/cellstar/pdf/RP-210S_P56xJd4jVhWhQ.pdf; May 27, 2004.
http://dmedia.mew.co.jp/nais-automotive/autopolice/index.htm; May 27, 2004.

* cited by examiner

*Primary Examiner*—Donnie L. Crosland
(74) *Attorney, Agent, or Firm*—Foley & Lardner LLP

(57) ABSTRACT

An alarm device including a sensor having sufficiently high detection sensitivity. The sensor 51 in the alarm device 41 is disposed such that a plane M perpendicular to the detection direction P of the sensor 51 is aligned at a specified angle θ with respect to a plane V perpendicular to the sun visor 72 (the lower surface 61a), were the specified angle θ should be set to be an approximately mean value of the expected minimum angle γ=0° and the expected maximum angle γ=40° (in this case, θ=20°). In other words, the plane M perpendicular to the detection direction P of the sensor 51 should be aligned at an angle α(α=90°−θ) of less than 90° with respect to the sun visor 72 (the lower surface 61a). The alarm device may be mounted onto a vehicle for preventing the vehicle theft.

5 Claims, 10 Drawing Sheets

F I G. 7
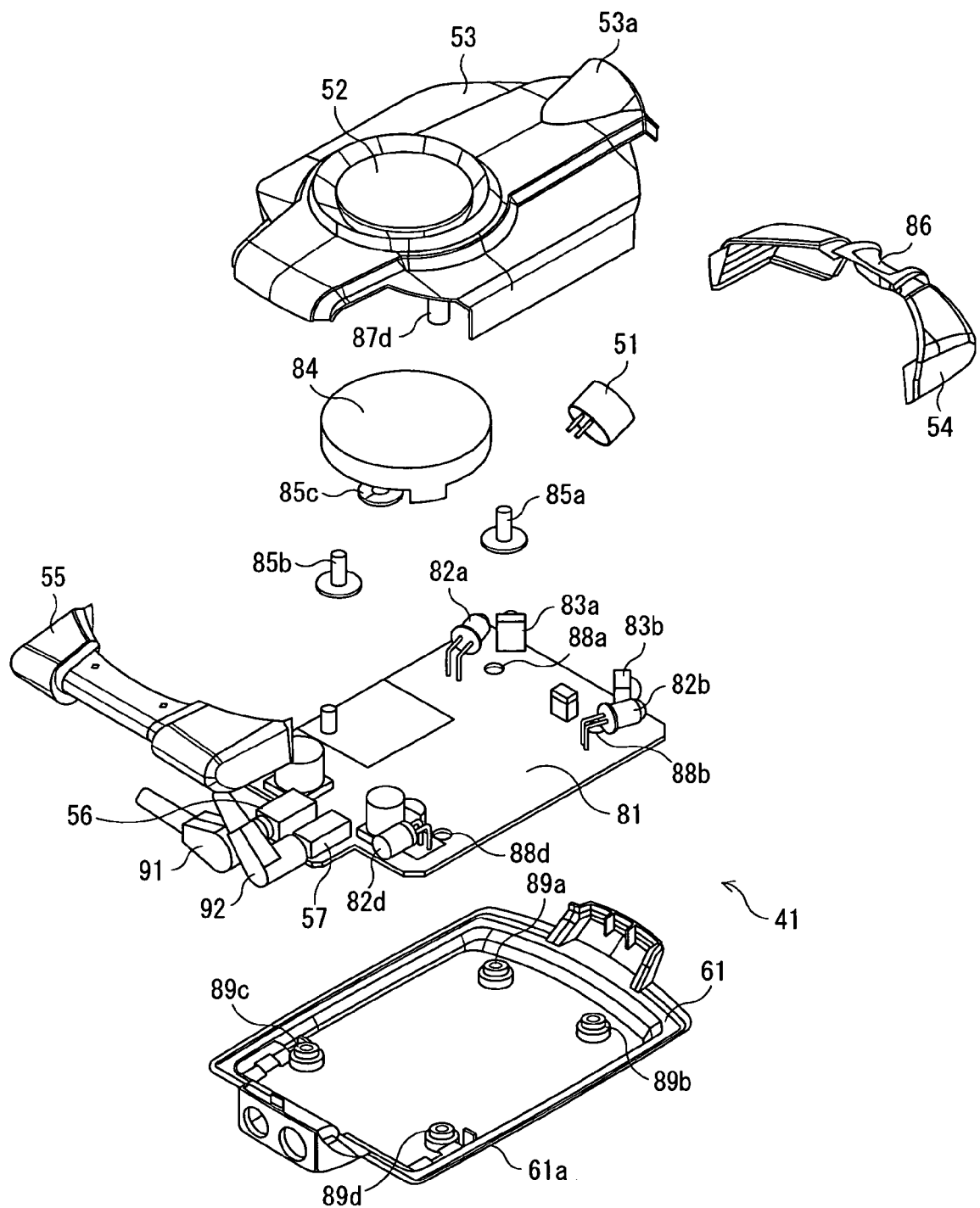

ALARM DEVICE

BACKGROUND OF THE INVENTION

1. Field of the Invention

The present invention relates to an alarm device, and more specifically to an alarm device, which is designed so as to provide sufficiently high detection sensitivity for a sensor mounted therein.

2. Description of the Related Art

In recent years, the use of antitheft device for vehicles is now widespread to prevent the theft of a vehicle. In such an antitheft device for vehicle, an ultrasonic sensor, infrared sensor or the like is used to detect the crack of a glass, the opening/closing of a door and others, thereby enabling a warning signal to be sounded for an abnormality.

As an antitheft device, there is a simple antitheft device for vehicle, whose main body can be mounted either onto the dashboard in the vehicle or onto a sun visor, wherein an exclusive plug for power supply is used to insert into a socket for cigarette lighter.

FIG. 1 shows an exemplified structure of a conventional antitheft device for vehicle (disclosed in "New Product Information", on-line searched on Nov. 27, 2002 by the Internet, http ://www52.tok2.com/home/cellstar/pdf/RP-210S_P56xJd4jVhWhQ.pdf). The antitheft device for vehicle in FIG. 1 comprises a main body 1 having a microcomputer for controlling various components constituting the antitheft device for vehicle; a sensor section 2 disposed inside the vehicle for monitoring the inside thereof, using an infrared sensor; and a hinge 3 for pivotally connecting the main body 1 to the sensor section 2.

The main body 1 is equipped with a fitting 4 having an approximately U-shaped section for inserting a sun visor 6 thereinto. A user can mount the antitheft device for vehicle in the inside of the vehicle by inserting the fitting 4 into the sun visor 6 in the direction of arrow shown in FIG. 1.

The hinge 3 includes a screw for adjusting the angle between the sensor section 2 and the main body 1. The screw serves to pivotally support the sensor section 2 within a angular range of inclination, where the sensor section 2 comes in contact with the main body 1, and therefore is held there at the maximum tilting angle. Accordingly, the user is able to adjust the angle between the sensor section 2 and the main body 1 by rotating the sensor section 2 around the screw axis.

FIG. 2 shows an exemplified structure of another conventional antitheft device for vehicle (disclosed in "The Alarm Device for Theft inside Vehicle", on-line searched on Nov. 27, 2002 by the Internet, http://dmedia.new.co.jp/nais-automotive/autopolice/index.htm). The antitheft device for vehicle shown in FIG. 2 comprises a main body 11 having a microcomputer for controlling various components constituting the antitheft device for vehicle and the sensor member 12 constituted by an infrared sensor for monitoring the inside of the vehicle.

The sensor member 12 is disposed in front of the main body 11 (on the left hand side in FIG. 2) such that it projects from the main body 11. Moreover, the main body 11 includes a microphone (not shown) for detecting a sound in the inside of the vehicle.

The antitheft device for vehicle can also be easily mounted onto a sun visor 13 with the aid of a fitting (not shown) mounted to the main body 11, as shown in FIG. 2.

As described above, since the antitheft device for vehicle can easily be mounted into the vehicle, any general user having no professional knowledge is able to mount the device with ease.

However, the antitheft device for vehicle in FIG. 1 requires adjusting the angle of the sensor section 2 relative to the main body 1 after the main body is mounted onto the sun visor 6, and the angle adjustment takes a lot of time and effort for a user. Moreover, there is a possibility that the sensor section 2 cannot be set at a proper angle if the general user having no professional knowledge tries to adjust the angle of the sensor section 2. In such a case, the sensor section 2 cannot provide sufficiently high detection sensitivity.

Moreover, there is a possibility that the user inserts a receipt of the admission fee to a high way or a parking coupon into the sun visor of the vehicle. As a result, when such a user inserts, for example, a receipt 14 of the admission fee to high way between the sun visor 13 and the main body 11 in the antitheft device for vehicle shown in FIG. 2, since the sensor member 12 projects from the main body 11, the receipt 14 thus inserted is in contact with the sensor member 12, as shown by the broken line in FIG. 2, or it covers the sensor member 12. In such a case, there is a problem for the sensor member 12 that the sensor member 12 cannot provide sufficiently high detection sensitivity.

Moreover, the microphone installed in the antitheft device for vehicle shown in FIG. 2 is aligned, for example, in the direction toward just below the antitheft device for vehicle mounted into the sun visor 13. Accordingly, the sound emitted just below the antitheft device for vehicle (toward the front of the vehicle) can be effectively detected. However, it is difficult to detect the sound emitted backward in the inside of the vehicle.

SUMMARY OF THE INVENTION

In view of the above-mentioned problems in the prior art, it is an object of the present invention to provide an alarm device, which is equipped with a sensor having sufficiently high detection sensitivity.

In accordance with the present invention, an alarm device has a first plane onto which a sensor is mounted, and a second plane facing the first plane and which second plane is disposed in a predetermined position, wherein a plane perpendicular to the detection direction of the sensor is set at a setting angle of less than 90 degrees relative to the second plane.

As the predetermined position, a relatively high position in the inside of the vehicle is used, for instance, the position on the sun visor or the dashboard, where, generally speaking, the sensor securely detects the abnormal state.

In accordance with the invention, the plane perpendicular to the detection direction of the sensor is set at an angle of less than 90 degrees relative to the second plane.

This structural arrangement provides sufficiently high detection sensitivity for the sensor. In particular, the positioning of the alarm device at a mounting position enables the sensor to detect a wider area inside the vehicle. Accordingly, the detection sensitivity of the sensor 51 can be maintained in an optimal state.

As for the sensor, it is preferable that a directional sound pressure sensor can be used.

As a result, even if a receipt is inserted between the sensor and the sun visor, and at the same time even if the receipt covers the alarm device, the sensor is not covered by the receipt, and therefore the sensor is maintained in the air permeable state. Accordingly, the sensor can always be maintained in an optimal detection state.

The setting angle can be selected from an angular range of 60° to 80°.

The sun visor mounted in the vehicle is disposed at a mounting angle relative to the horizontal surface of the ceiling in the vehicle. The setting angle can be set preferably at an angle, which is obtained by subtracting an approximately mean value of the minimum mounting angle and the maximum mounting angle from 90° for various vehicle types.

Even if the alarm device is mounted onto a sun visor, which is disposed at a setting angle of 0° to 40°, the sensor is capable of detecting a wider area inside the vehicle, thereby enabling the sensor 51 to be maintained in an optimal state of high detection sensitivity.

As described above, the alarm device according to the present invention may provide sufficiently high detection sensitivity for the sensor. In particular, the disposition of the alarm device in a mounting position allows the sensor to detect a wider area inside the vehicle, thereby enabling the sensor to be maintained in an optimal state for the detection sensitivity.

Further objects, features and advantages of the present invention will become apparent from the following description of the preferred embodiments with reference to the accompanying drawings.

BRIEF DESCRIPTION OF THE DRAWINGS

FIG. 7 is an exploded perspective view of the alarm device shown in FIG. 3;

DESCRIPTION OF THE PREFERRED EMBODIMENTS

Referring now to the accompanying drawings, the present invention will be described in detail.

Figure 1:
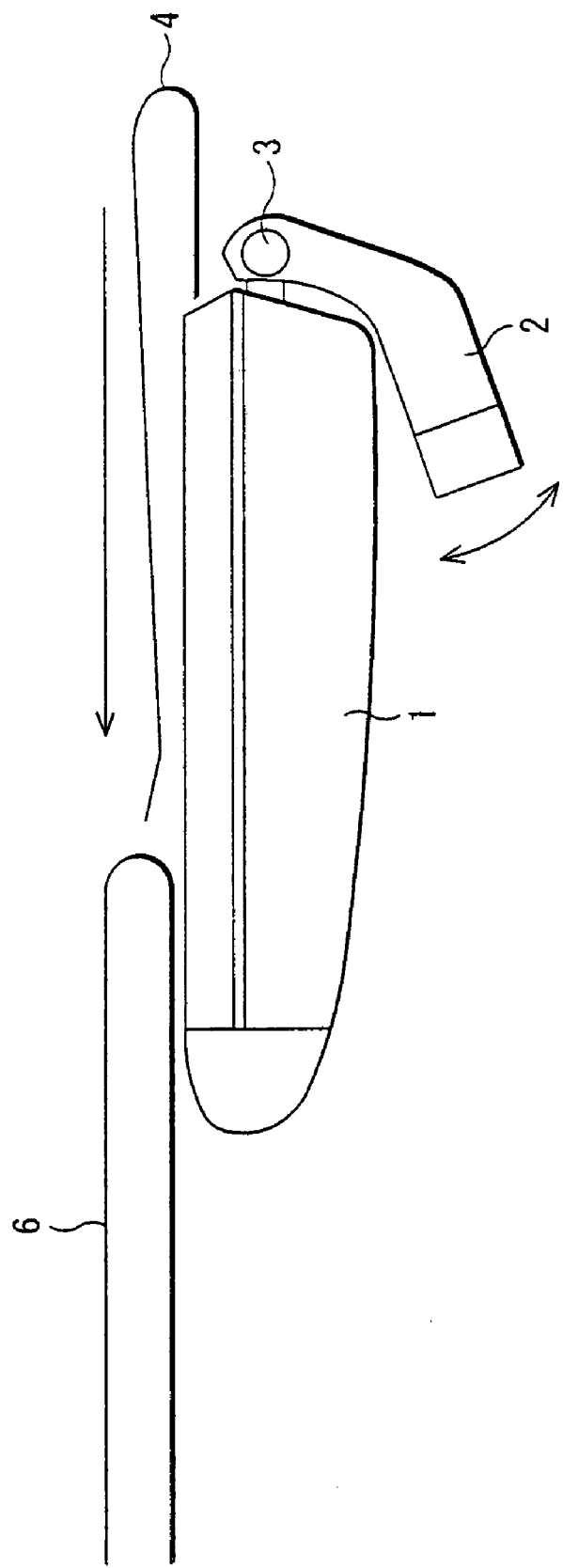
FIG. 1 shows the external appearance of a conventional alarm device in side view.
Figure 2:
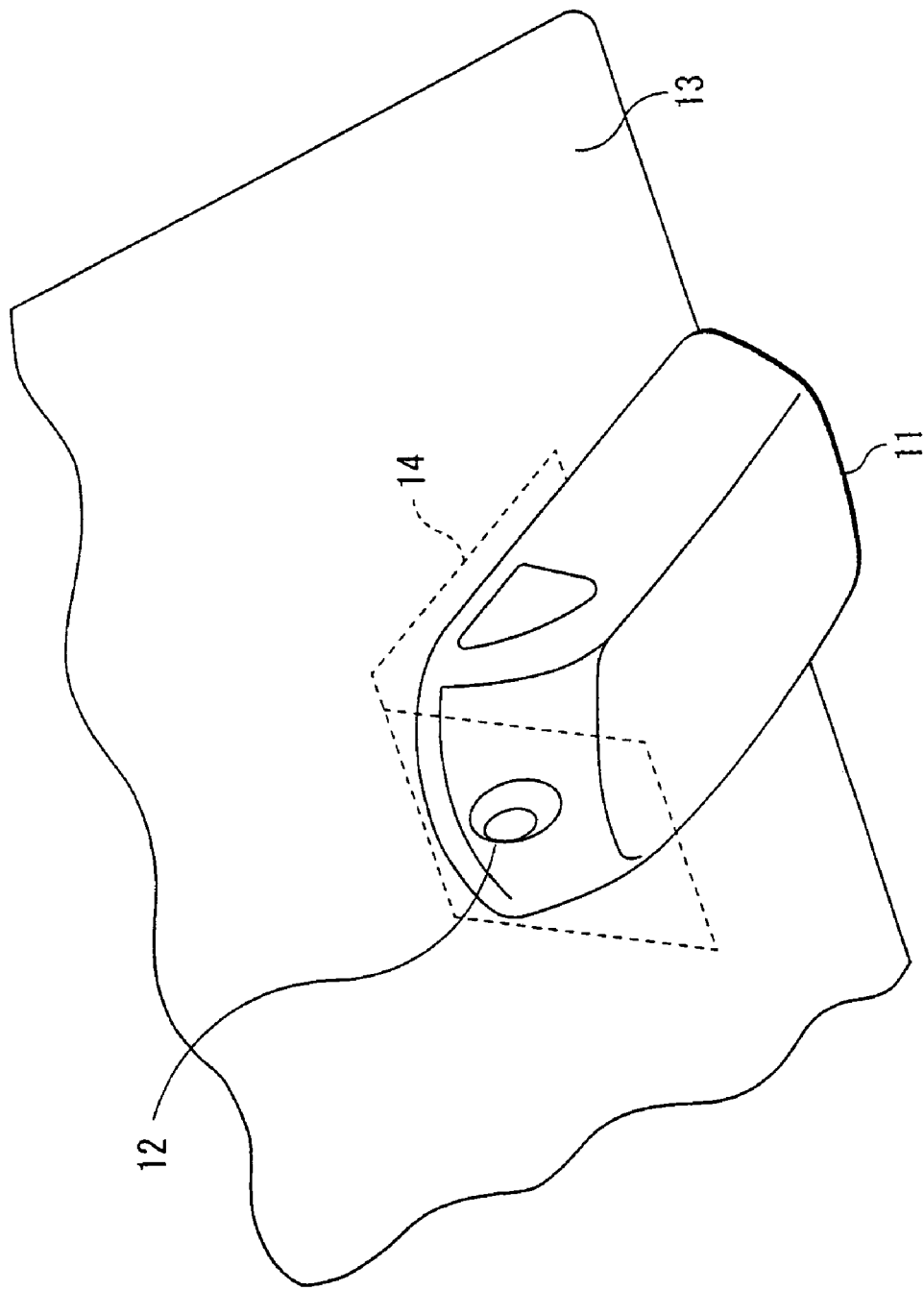
FIG. 2 shows the external appearance of another conventional alarm device in perspective view.
Figure 3:
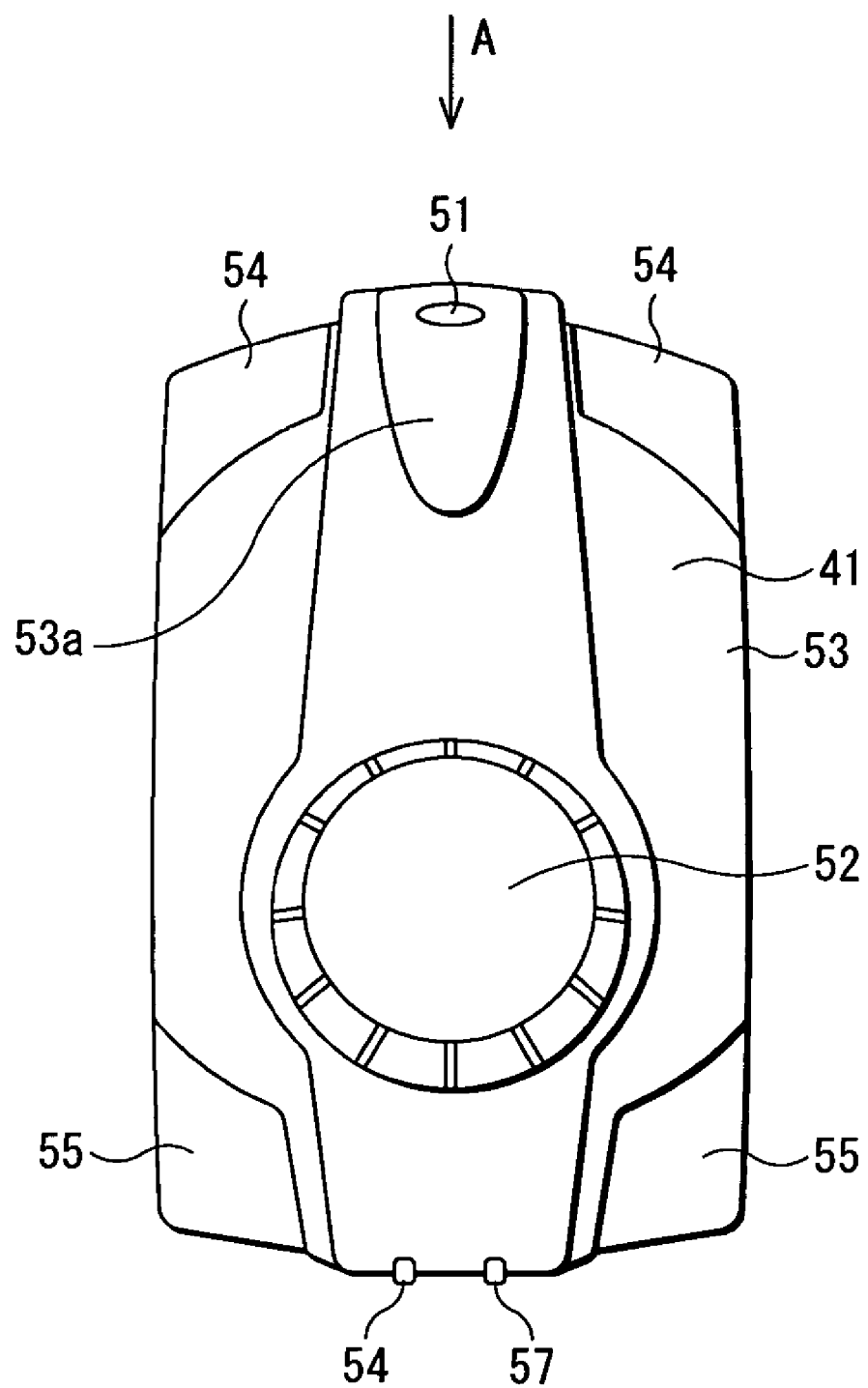
FIG. 3 shows the external appearance of an alarm device according to the invention in plan view.

FIG. 3 shows the external appearance of an alarm device to prevent the theft of a vehicle according to the invention in plan view.

Figure 4:
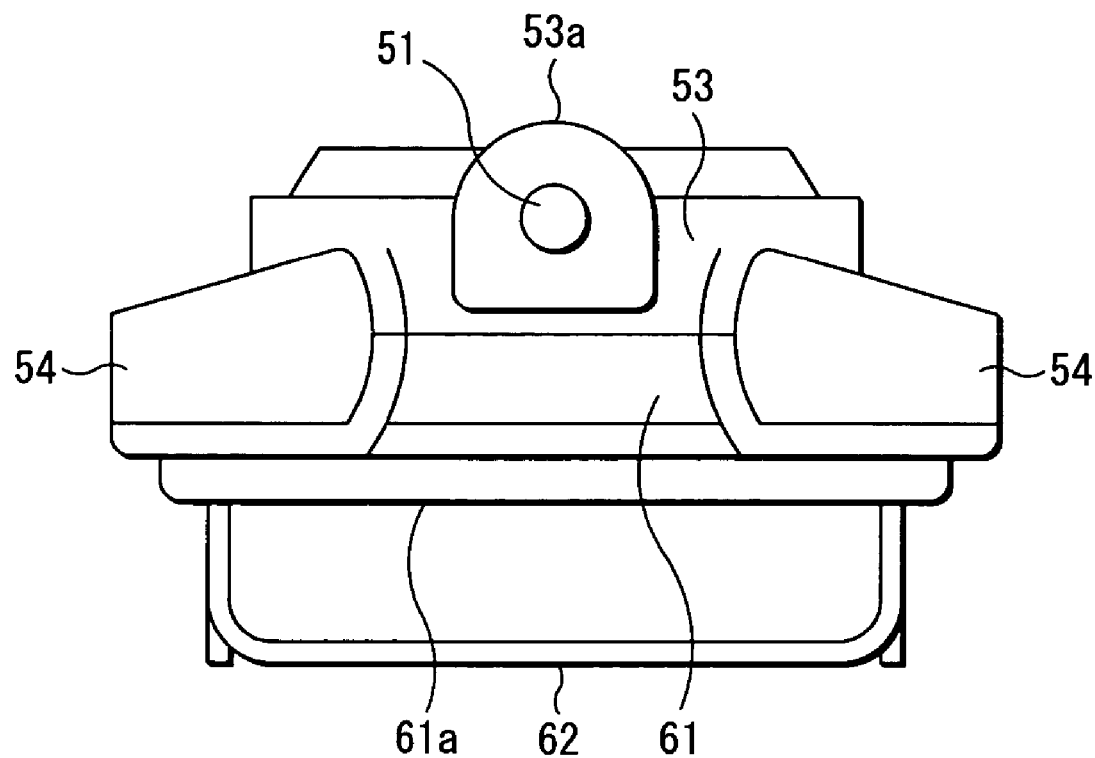
FIG. 4 is a side view of the alarm device shown in FIG. 3 for illustrating the external appearance.

The alarm device 41 is constituted such that a housing top 53 having a sensor 51 and a speaker 52; and a housing bottom 61 which will be described below with reference to FIG. 4 are fitted into each other so as to clamp a lens front 54 and a lens rear 55, which are positioned respectively at the upper and lower positions of the housing top 53 in FIG. 3.

A sensor fixing section 53a for fixing the sensor 51 is disposed at the upper center position of the housing top 53. The sensor fixing section 53a has an aperture. The sensor 51 is fixed to the inside of the housing top 53 in such a way that the sensor 51 is capable of detecting an abnormality in the inside of the vehicle (the outside of the housing top 53) through the aperture. In this case, the sensor 51 is fixed such that it is not projected from the sensor fixing section 53a.

The sensor 51 is constituted by, for instance, a directional sound pressure sensor, and detects a change in sound pressure inside the vehicle, which results from the opening/closing of a door or the fracture of a glass. In the case when the abnormality is sensed, the sensor 51 supplies a signal of abnormality to CPU 121, which will be described below with reference to FIG. 9. In conjunction with the above, it should be noted that the sensor 51 can be constituted by a sensor other than the sound pressure sensor. The sensor 51 constituted such that it supplies the signal of abnormality to a remote controller possessed by a user.

The speaker 52 is disposed at the center of the housing top 53 shown in FIG. 3. When an operation mode or a detection signal level of the sensor 51 is set, the speaker 52 emanates a confirmation sound from a buzzer 84 in response to the instruction from the user's remote controller 100, where the buzzer 84 will be described below with reference to FIG. 7. Moreover, the sensor 51 emanates an alarm sound from the buzzer 84, when it detects an abnormality resulting from the opening/closing of a door or a crash of a glass.

A power supply terminal 56, to which a power supply plug 91 for supplying an electric power from a secondary cell of a battery unit (not shown) may be removably inserted, and an optional connection terminal 57 for connecting an optional apparatus are both provided on the lower surface of the housing top 53 (the power supply plug 91 will be described below with reference to FIG. 7).

The lens front 54 is formed by, for instance, a semi-transparent red acrylic plate, and it covers LED's 82a and 82b which are disposed respectively on the upper left and upper right sides of the sensor 51, in which case, the LED's 82a and 82b will be described below with reference to FIG. 7. Consequently, when the sensor 51 detects an abnormal state, the light emitted from LED's 82a and 82b passes through the lens front 54, and then diffuses in red light, thereby making it possible to bring the abnormality to an attention of a person in the vicinity of the vehicle.

The lens rear 55 is formed by, for instance, a semi-transparent red acrylic plate, as similarly to the lens front 54, and it covers LED's 82c and 82d which are disposed respectively on the lower left and lower right sides, in which case, the LED's 82c and 82d will be described below with reference to FIG. 7. Consequently, when the sensor 51 detects such an abnormal state, the light emitted from LEDs 82c and 82d passes through the lens rear 55, and then diffuses in red light.

FIG. 4 is a side view of the alarm device 41 shown in FIG. 3 in the case when the sensor 51 is viewed in the direction of arrow A.

The alarm device 41 is constituted in such a way that the housing top 53 as a first plane and the housing bottom 61 as a second plane are engaged with each other. A mounting spring 62 for mounting the alarm device 41 onto a sun visor 72 or the like in the vehicle with ease is provided on the lower surface 61a of the housing bottom 61, where the mounting of the alarm device 41 will be described below with reference to FIG. 6. A user is able to mount the alarm device 41 onto the sun visor 72 by inserting it between the mounting spring 62 and the lower surface 61a of the housing bottom 61. In this case, the lower surface 61a is constituted in the form of a horizontal plane such that it becomes into contact with the sun visor 72.

Figure 5:
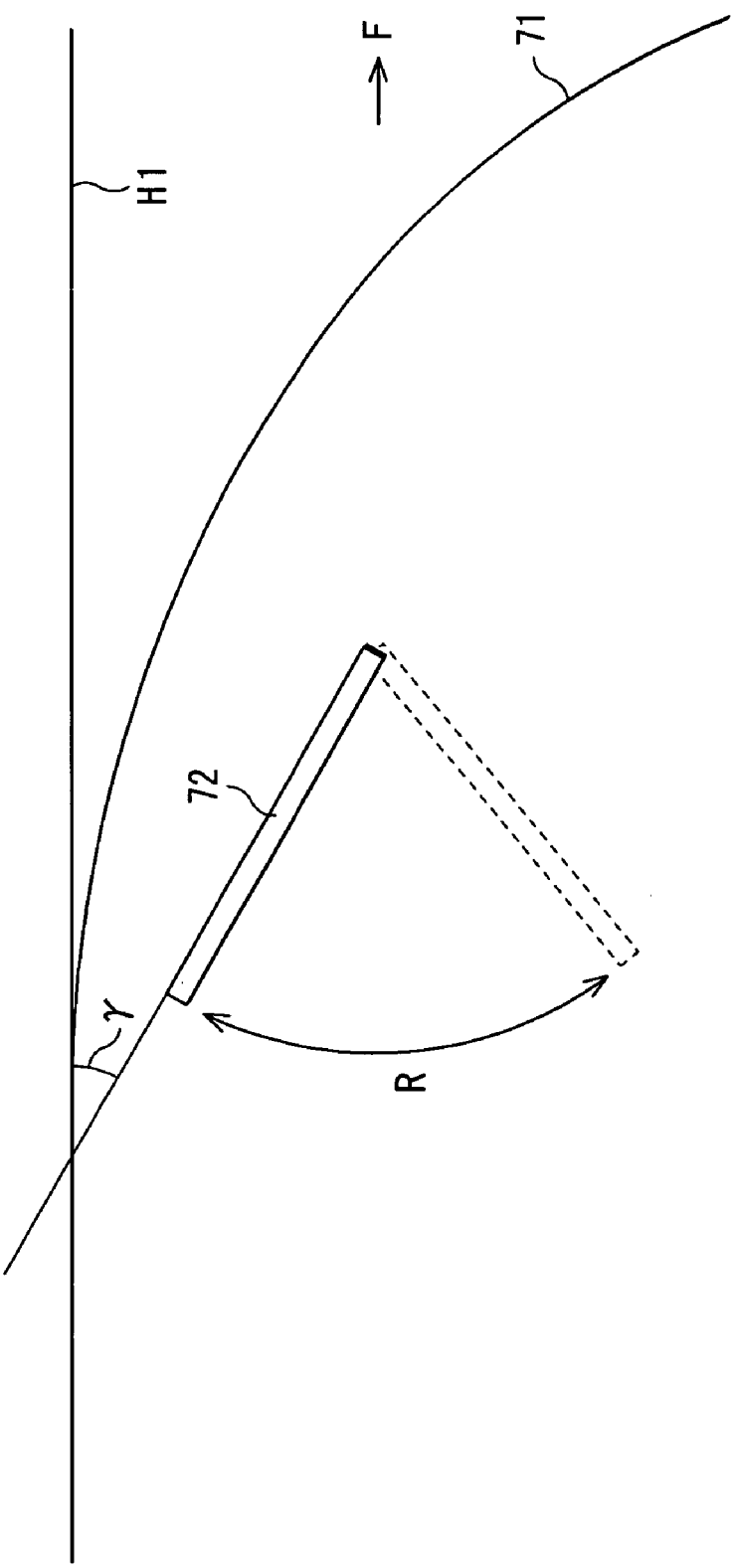
FIG. 5 is a diagram for elucidating the mounting angle of a sun visor inside the vehicle.
Figure 6:
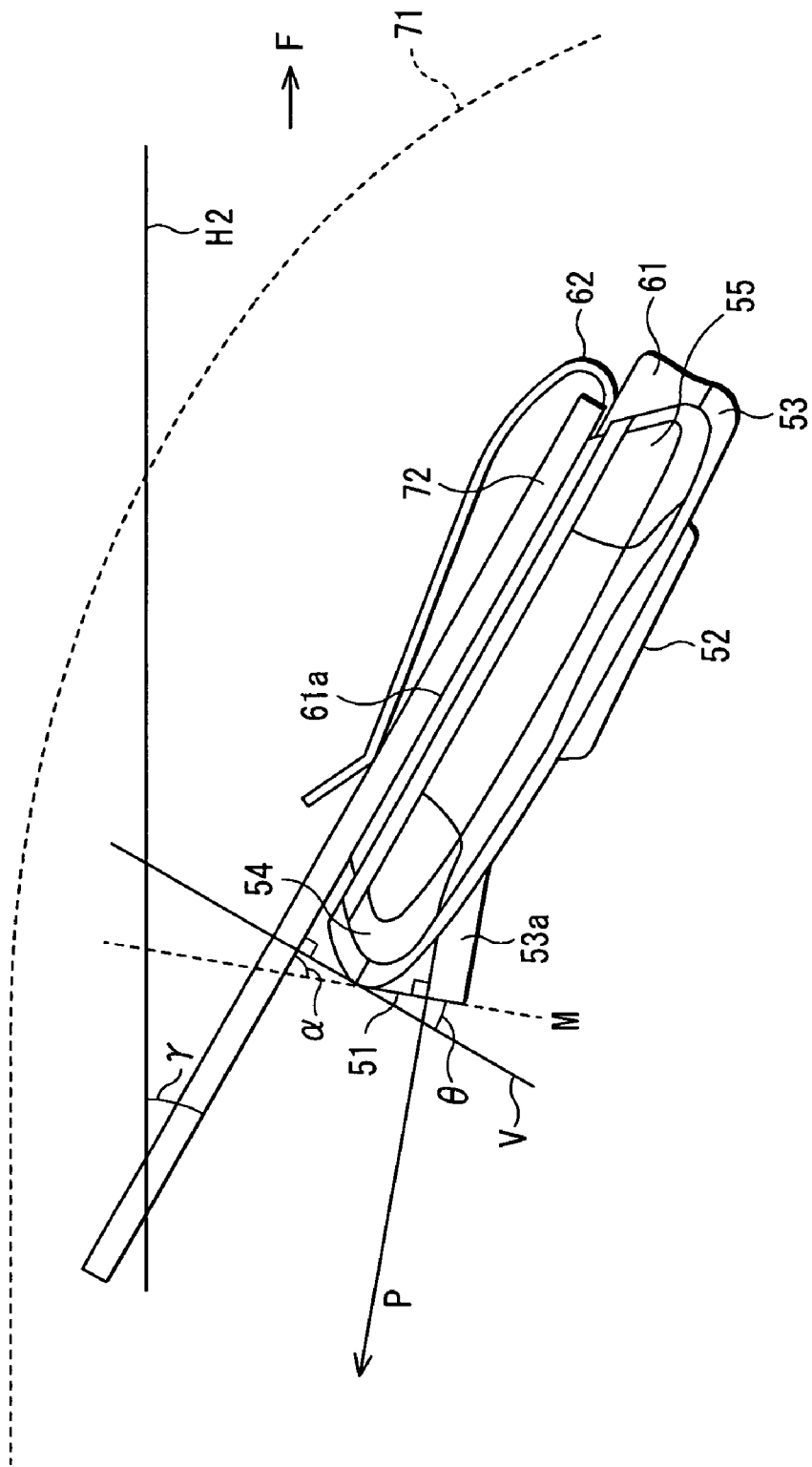
FIG. 6 is a side view of the alarm device shown in FIG. 3, where it is mounted onto the sun visor at a mounting angle shown in FIG. 5.

In the following, referring to FIGS. 5 and 6, the angle between the sun visor 72 and the sensor 51 inside the vehicle will be described. FIG. 5 illustrates the mounting angle at which the sun visor 72 is mounted, and FIG. 6 illustrates the angle of the sensor 51 in the alarm device 41 mounted onto the sun visor 72 shown in FIG. 5. As a result, it is assumed that plane H2 in FIG. 6 is a plane parallel to plane H1 in FIG. 5.

The mounting angle of the sun visor 72 in the state where it is mounted in the inside of the vehicle is varied in accordance with the type of vehicle. Generally, as shown in FIG. 5, the sun visor 72 is mounted such that it is parallel to a car body 71 on the front side of the vehicle in the direction of arrow F. In this case, an axis (not shown) for rotating the sun visor 72 in the direction of arrow R is disposed in the front side of the vehicle. The car body 71 is normally designed so as to have a smoothly curved profile from the top to the front side (in the direction of arrow F). Mostly, the sun visor 72 is mounted such that it directs to the upper part of the vehicle.

The present inventors studied the angle $\gamma$ of the mounted sun visor 72 for various types of vehicle, and found that the sun visor 72 was mounted at an angle $\gamma$ of 10° to 30° relative to the plane H1 which was parallel to the horizontal surface corresponding to the ceiling of the vehicle. In view of the information regarding the angle of sun visors 72 for various types of the vehicles currently used, it is assumed on the basis of the investigation result that the angle $\gamma$ of the sun visor 72 relative to the plane H1 is within a range of 0° to 40°. This implies that an expectable minimum angle of the sun visor 72 is $\gamma=0°$ and an expectable maximum angle of the sun visor 72 is $\gamma=40°$.

Moreover, as shown in FIG. 6, the sensor 51 has an approximately conical detection range (not shown) in front of the sensor 51, which detection range extends from detection direction P at the center of the sensor 51. In particular, the highest detection sensitivity is obtained in an angular range of ±20° relative to the detection direction P of the sensor 51.

From the above fact, it is preferable that the sensor 51 should be mounted such that plane M perpendicular to the detection direction P of the sensor 51 is set at an angle $\theta$ relative to plane V perpendicular to the sun visor 72 (the lower surface 61a), where the angle $\theta$ is approximately the mean value of the expected minimum angle $\gamma=0°$ and the expected maximum angle $\gamma=40°$ of the sun visor 72 relative to the plane H2 (plane H1) (in this case, $\theta=20°$). In other words, the sensor 51 is mounted such that the plane M perpendicular to the detection direction P of the sensor 51 is set at an angle $\alpha(\alpha=90°-\theta)$ of less than 90° relative to the sun visor 72 (the lower surface 61a).

In such a structural arrangement, so long as the alarm device 41 is mounted onto the sun visor 72 at an angle of $\gamma=0°$ to 40°, the optimal detection range of the sensor 51 in the alarm device 41 (the angular range of ±20° with respect to the detection direction P of the sensor 51) extends over a wide range inside the vehicle, including the area in the rear seats, thereby enabling the detection sensitivity of the sensor 51 to be maintained in a proper state. Hence, the vehicle theft can be detected for the seats behind the driver's seat, where a thief often enters the space for the vehicle theft.

As described above, the sensor 51 is mounted (the sensor fixing section 53a is formed) such that the plane M perpendicular to the detection direction P of the sensor 51 is set at an angle $\theta$ relative to the plane V perpendicular to the sun visor 72 (the lower surface 61a), where the angle $\theta$ is approximately the mean value of the expected minimum angle $\gamma=0°$ and the expected maximum angle $\gamma=40°$ of the sun visor 72 relative to the plane H2 (in this case, $\theta=20°$), that is, such that the plane M perpendicular to the detection direction P of the sensor 51 is set at an angle $\alpha$ of less than 90° relative to the sun visor 72 (the lower surface 61a). As a result, when a user mounts the alarm device 41 onto the sun visor 72, using the mounting spring 62, it is possible to carry out the detection in a wider area inside the vehicle with the sensor 51. Hence, the detection sensitivity of the sensor 51 can always be maintained in an optimal state.

Furthermore, the alarm device 41 in which the mounting screw 62 is removed from the housing bottom 61 can be mounted onto the dashboard of the vehicle, after the lower surface 61a of the housing bottom 61 is aligned downward.

FIG. 7 is an exploded perspective view of the alarm device 41. In FIG. 7, the same symbols are attached to the same functional elements in FIGS. 3 to 5, and the description thereof is further omitted to avoid the repetition.

A base plate 81 is placed on the housing bottom 61 to place various circuits for operating the alarm device 41. In addition to the circuits, the connection terminal 56 and optional connection terminal 57 which have been already described above with reference to FIG. 3, as well as LED's 82a to 82d and infrared light receiving sections 83a and 83b are mounted onto the base plate 81. In this case, LED 82c is hidden by the lens rear 55 shown in FIG. 7. In FIG. 7, moreover, a power supply plug 91 for supplying the power from a secondary cell or the like of a battery unit (not shown) is connected to the connection terminal 56, and further an optional connection plug 92 is connected to the optional connection terminal 57 for connecting an optional apparatus.

Each of LED's 82a to 82d is mounted on the base plate 81 at the corresponding corner, such that it aligns in the direction toward the corner, and it continuously or intermittently emits light, when the sensor 51 detects an abnormal state. Moreover, the alarm device 41 can be operated at a warning mode as an operation mode. In the case when the alarm device 41 is operated at the warning mode, LED's 82a to 82d sequentially repeat the blinking light emission. As a result, a person who is able to watch the alarm device 41 from the outside of the vehicle is under an illusion that the alarm device is always monitoring the inside of the vehicle in all directions.

In addition, infrared light receiving sections 83a and 83b for receiving infrared light signals supplied from a remote controller 100 are disposed at the edge opposite to the connection terminal 56 on the base plate 51, such that they are aligned in the direction toward to the corresponding corners, where the remote controller 100 will be described below with reference to FIG. 8. In other words, the infrared light receiving section 83a is positioned on the right side in the vicinity of LED 82a, such that it directs to LED 82a (left corner) at a slightly deviated inclination angle, in which case, LED 82a is disposed at the left corner on the side opposite to the connection terminal 56 on the base plate 81, and similarly the infrared light receiving section 83b is positioned on the left side in the vicinity of LED 82b, such that it directs to LED 82b (right corner) at a slightly deviated inclination angle, in which case, LED 82b is disposed at the right corner.

As described above, each of the infrared light receiving sections 83a and 83b is positioned so as to direct to the corresponding corner, so that the infrared light signal transmitted can be received in the directions toward two planes connected to each other at the corresponding corner. Consequently, a user can carry out the setting and/or the operation of the alarm device 41 either on the side of the driver seat or on the side opposite thereto in the vehicle, using the remote controller 100 possessed by him.

The lens front 54 constituted by a semi-transparent red acrylic plate is disposed on an edge side, where LED's 82a and 82b as well as the infrared light receiving sections 83a and 83b are disposed on the base plate 81. Similarly, the lens rear 55 constituted by a semi-transparent red acrylic plate is disposed on another edge side where LED's 82c and 82d are disposed on the base plate 81. Consequently, as described above with reference to FIG. 3, continuous or blinking emission of red light from LED's 82a to 82d covered by the lens front 54 and the lens rear 55 can be discerned, thereby enabling the light emission to be watched by a person in the vicinity of the vehicle.

Moreover, as described above, each of LED's 82a to 82d is disposed on the base plate 81 such that it directs to the corresponding corner, i.e., to the corresponding corner in the lens front 54 or the lens rear 55. As a result, the ability of discerning light in the lens front 54 and lens rear 55 is enhanced as for the directions toward two planes connected to each other at the corresponding corner.

Three screw receiving portions (not shown) are formed on the surface opposite to the speaker 52 in the housing top 53, and a buzzer 84 for sounding a warning signal is fixed just below the speaker 52, using screws 85a to 85c for the corresponding screw receiving portions.

The housing top 53 has four hooks, each of which is formed on one of four sides of the plane facing the housing bottom 61, and the housing bottom 61 has four holes, each of which is formed for the hooks respectively on one of four sides of the plane facing the housing top 53. The housing top 53 is engaged with the housing bottom 61 by inserting the hooks into the corresponding holes. A sensor support portion 86 for supporting the sensor 51 together with a sensor fixing portion 53a is formed at the upper center of the lens front 54.

Thus, the sensor 51 is placed on the sensor support portion 86, and then the housing top 53 is engaged with the housing bottom 61 in which the base plate 81, lens front 54 and lens rear 55 are mounted. Then, the sensor 51 is securely fixed to the sensor fixing portion 53a and the sensor support portion 86 in the housing top 53. By doing so, the alarm device 41 is assembled.

Moreover, the housing top 53 has screw receiving portions 87a to 87d on the plane facing the housing bottom 61 (the screw receiving portions 87a to 87c are hidden in FIG. 7). The base plate 81 has screw holes 88a to 88d in accordance with the corresponding positions of the screw receiving portions 87a to 87d (the screw hole 88c is hidden by the lens rear 55 in FIG. 7), and the housing bottom 61 also has screw holes 89a to 89d in accordance with the corresponding positions of the screw receiving portions 87a to 87d.

Screws (not shown) for the screw receiving portions 87a to 87d are inserted from the lower surface 61a of the housing bottom 61 to the screw receiving portions 87a to 87d of the housing top 53 via the screw holes 89a to 89d and the screw holes 88a to 88d. Thereafter, the screws are fastened using a driver, and then by engaging the housing top 53 with the housing bottom 61, the alarm device 41 is assembled and secured, such that it cannot be dismantled with ease.

Figure 8:
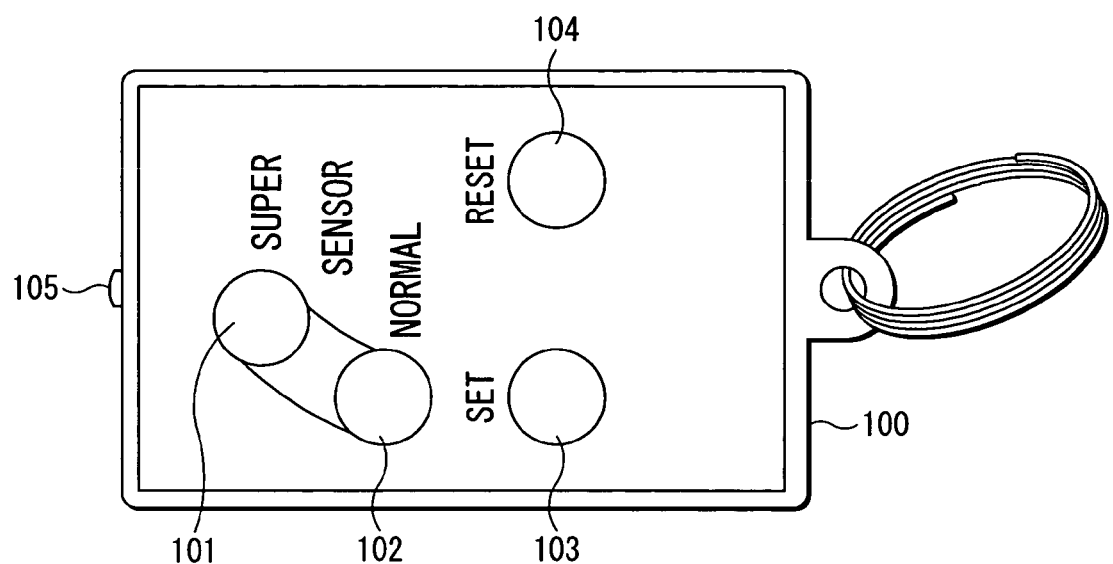
FIG. 8 is a schematic frontal view of a remote controller for controlling the alarm device shown in FIG. 3.

FIG. 8 is a schematic frontal view of a remote controller for controlling the above-described alarm device 41.

In FIG. 8, on the frontal surface of the remote controller 100, there are a super button 101 for converting the detection level of the sensor 51 in the alarm device 41 to a super weak signal level at which an abnormal state in a very weak signal level can be detected; a normal button 102 for converting the detection level of the sensor 51 to a normal signal level at which the sensor sensitivity is lower than the super weal signal level; an alarm setting button 103 for setting the operation mode of the alarm device 41 to an alarm mode at which the alarm device 41 is operated as a antitheft device for vehicle; and an alarm releasing button 104 for releasing the alarm mode such that the alarm device 41 is not operated as the antitheft device for vehicle.

Moreover, on the left side of the remote controller 100, there is an infrared light emission section 105 for emitting infrared light in order to transmit a signal of operation to the alarm device 41 when a user operates one of the above-mentioned buttons.

When the user operates one of the super button 101, normal button 102, alarm setting button 103 and alarm releasing button 104 which are all described above by directing the infrared light emission section 105 of the remote controller 100 to the infrared light receiving section 83a or 83b in the alarm device 41, an infrared light signal is output from the infrared light receiving section 105 in accordance with the user's operation. When the infrared light signal is received in the infrared light receiving section 83a or 83b of the alarm device 41, the alarm device 41 operates in accordance with the user's instruction.

Figure 9:
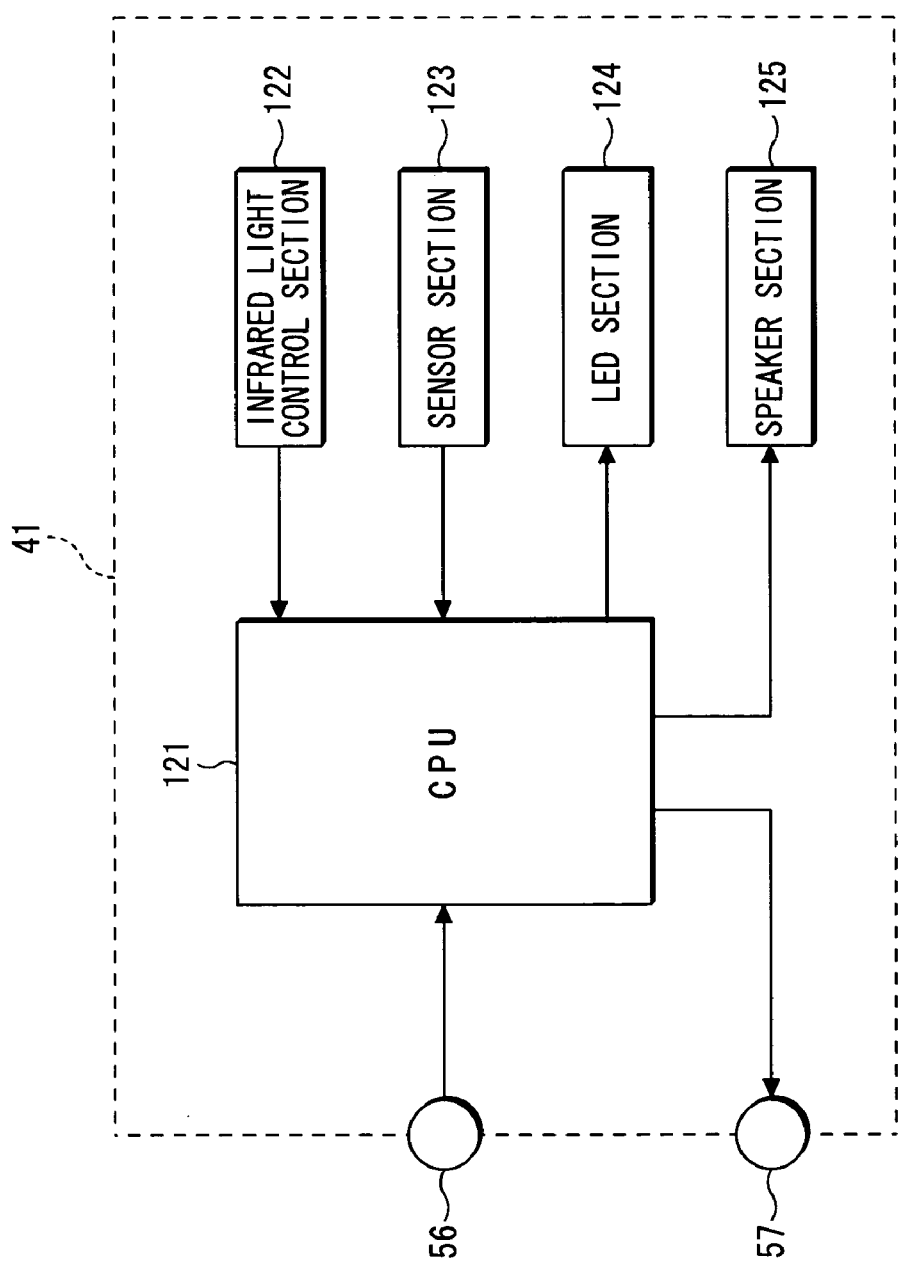
FIG. 9 is a block diagram of an electrical system in the alarm device shown in FIG. 3.

In the following, an embodiment of an electrical system in the above-mentioned alarm device 41 will be described. FIG. 9 illustrates a block diagram of the electrical system in the alarm device 41, which is shown in FIGS. 3 to 5 and in FIG. 7.

From the power supply terminal 56 to which a power supply plug 91 or the like is connected, an electric power is supplied to CPU 121 for controlling various parts of the alarm device 41 and to the other blocks requiring the power supply.

An infrared light control section 122 including the infrared light receiving sections 83a and 83b receives an infrared light signal which is supplied from the infrared light emission section 105 of the remote controller 100 shown in FIG. 8, and then converts the light signal into an electrical signal to supply the CPU 121.

A sensor section 123 including the sensor 51 detects the abnormal state in the sound wave or vibration sensed by the sensor 51, and then supplies the detection results to CPU 121.

CPU 121 executes various processes for signaling the abnormality on the basis of various bits of the information thus supplied. CPU 121 controls an LED section 124 including LED's 82a to 82d to activate LED's 82a to 82d for emission; it controls a speaker section 125 including the buzzer 84 and speaker 52 to emanate an alarm sound from buzzer 84 via the speaker 52; and it controls an optional apparatus connected to the optional connection terminal 57.

Figure 10:
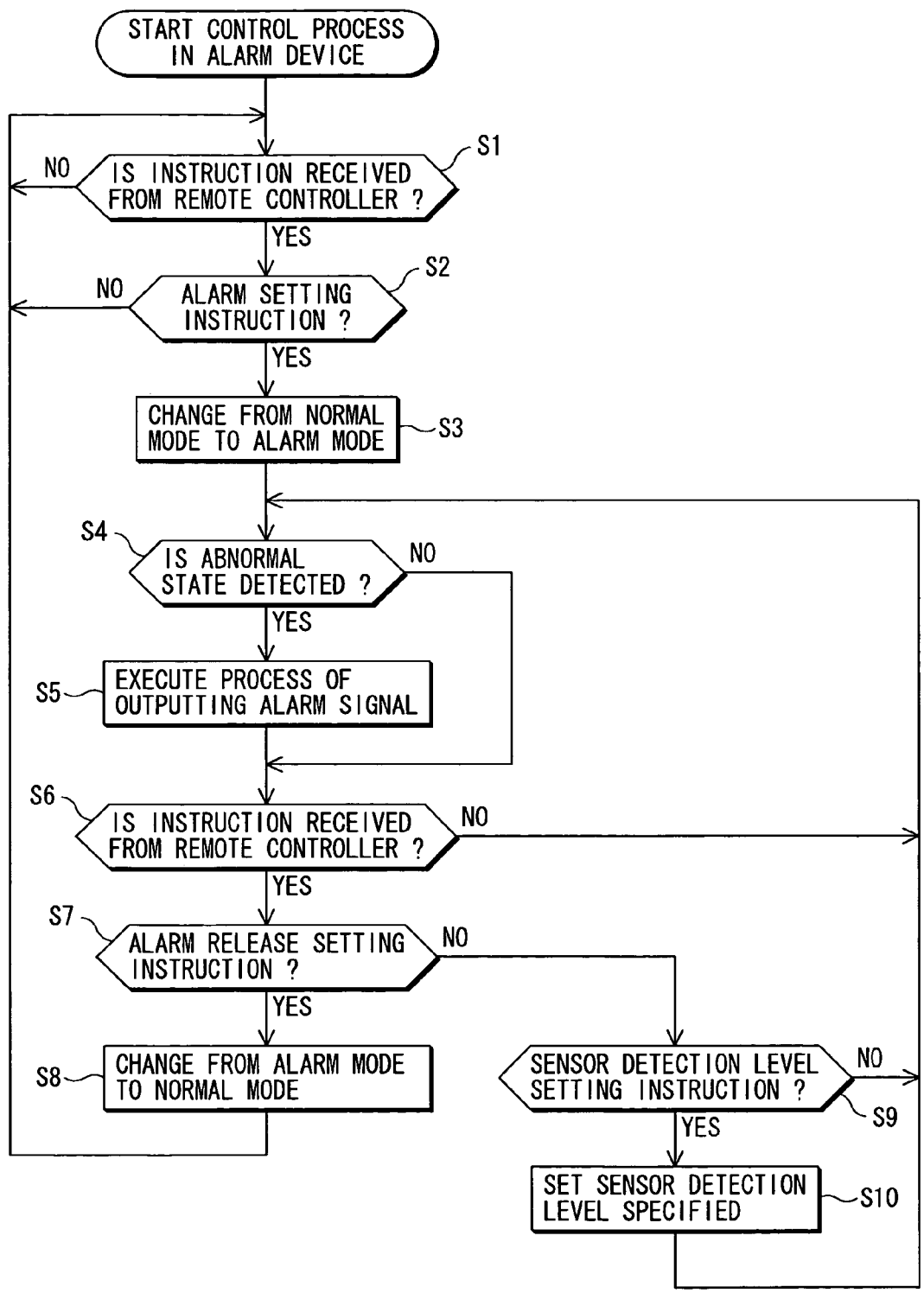
FIG. 10 is a flow chart for elucidating the control process in the alarm device shown in FIG. 3.

In the following, the function of these sections will be described. When an electric power is supplied from the power supply terminal 56 to CPU 121 in the alarm device 41 shown in FIG. 9, it starts to control the sections in the alarm device 41 and to execute the processes for detecting the abnormal state in the inside of the vehicle. Referring now to the flow chart in FIG. 10, an example of the control process in the alarm device 41 will be described.

Firstly, CPU 121 in the alarm device 41 waits for the start of operation in step S1, until the infrared light control section 122 receives an instruction from the remote controller 100 shown in FIG. 8. When information about a user's instruction depending upon the user's operation of the remote controller 100 is supplied as an infrared light signal from the remote controller 100, CPU 121 receives the information via the infrared light control section 122, and judges in step S1 whether or not the instruction from the remote controller 100 is received, and then executes the process in step S2. In the case when the processes in the steps S1 and S2 are executed, the alarm device 41 operates in the normal mode in which the function of the sensor 51 is stopped.

In step S2, CPU 121 judges whether or not the instruction supplied from the remote controller 100 is a warning setting instruction for activating the sensor 51 and for instructing the setting of the alarm mode for carrying out the warning action. In the case when the received instruction is judged not to be the warning setting instruction, CPU 121 returns to the process in step S1 and repeats the processes following the process in step S1. In step S2, when the received instruction is judged to be the warning setting instruction, CPU 121 executes the process in step S3 to change the operation from the normal mode to the warning mode.

In accordance with the function, CPU 121 executes the process of outputting the setting confirmation for signaling the setting confirmation of the alarm mode by controlling the speaker section 125 to emanate a confirmation sound of setting the alarm mode from the buzzer 84 via the speaker 52, and by controlling the LED section 124 to activate LED's 82a to 82d for light emission. In this case, the confirmation sound has a sufficiently smaller sound pressure, compared with the alarm sound, and the light emission for the confirmation is different from the light emission for the alarm. In the alarm mode, CPU 121 controls the LED section 124 to sequentially activate LED's 82a to 82d for blinking light emission. As a result, a person watching the alarm device 41 outside the vehicle is under an illusion that the alarm devices always monitor all around.

In step S4, CPU 121 controls the sensor section 123 and judges whether or not an abnormal state is detected. In the case when an abnormal state is detected in step S4, CPU 121 executes the process in step S5 and controls the speaker section 125 to execute the alarm output process of signaling an alarm, in which case, an alarm sound emanates from the buzzer 84 via the speaker 52 and/or LED's 82a to 82d are activated so as to emit light by controlling the LED section 124. CPU 121 executes the process in step S6, after carrying out the alarm outputting process. On the contrary, when the sensor 51 does not detect an abnormal state in step S4, so that CPU 121 judges that the abnormal state is not yet sensed, CPU 121 skips the process in step S5 and executes the process in step S6.

In step S6, CPU 121 examines whether or not the infrared light control section 122 receives an instruction from the remote controller 100. When it is judged in step S6 that an instruction from a user is not received via the infrared light control section 122, CPU 121 returns to the process in step S4 and repeats the processes following the process.

On the contrary, when it is judged in step S6 that the instruction from the user is received via the infrared light control section 122, CPU 121 goes to the process in step S7. Then, CPU 121 examines whether or not the instruction is the alarm release setting instruction. When it is judged in step S7 that the instruction from the user is the alarm release setting instruction, CPU 121 changes the operation mode from the warning mode to the normal mode in step S8. In this case, CPU 121 executes the setting confirmation output process for signaling the confirmation of releasing the alarm mode by controlling the speaker section 125 to output the confirmation sound for releasing the alarm mode from the buzzer 84 via the speaker 25 and/or by controlling the LED section 124 such that LED's 82a to 82d emit light. Thereafter, CPU 121 returns to the process in step S1 and repeats the processes following the process.

On the contrary, when it is judged in step S7 that the instruction from the user is not the alarm release setting instruction, CPU 121 examines in step S9 as to whether or not the instruction from the user is a sensor detection level setting instruction for instructing to set the detection level of the sensor 51. When it is judged in step S9 that the instruction from the user is not the sensor detection level setting instruction, CPU 121 returns to the process in step S4 and repeats the processes following the process.

On the contrary, when it is judged in step S9 that the instruction from the user is the sensor detection level setting instruction, CPU 121 goes to the process in step S10 and converts the sensor detection level of the sensor 51 into a specified sensor detection level (either the super weak level or the normal level). In this case, CPU 121 controls the speaker section 125, and then executes the setting confirmation output process for signaling the confirmation of setting the sensor detection level by outputting the confirmation sound of indicating that the sensor detection level is set from the buzzer 84 via the speaker 52 and/or by controlling the LED section 124 to emit light from LED's 82a to 82d. Thereafter, CPU 121 returns to the process in step S4, and repeats the processes following the process.

Thus, CPU 121 controls the respective sections of the alarm device 41 and repeatedly executes the alarm processes for members in the vehicle during the power supply period. In the above description, it is assumed that the alarm device 41 signals an alarm sound from the buzzer 84 via the speaker 52 and activates LED's 82a to 82d to emit light. However, the present invention is not restricted to the usage of such functions. For instance, the alarm device 41 can be designed such that it communicates with a remote controller possessed by a user and then transmits alarm information to the remote controller.

As described above, the sensor 51 in the alarm device 41 is disposed (the sensor fixing portion 53a is formed) such that the plane M perpendicular to the detection direction P of the sensor 51 is aligned at a specified angle θ with respect to the plane V perpendicular to the sun visor 72 (the lower surface 61a), where the specified angle θ should be set to be an approximately mean value of the expected minimum angle γ=0° and the expected maximum angle γ=40° (in this case, θ=20°), that is, such that the plane M perpendicular to the detection direction P of the sensor 51 is aligned at an angle α of less than 90° with respect to the sun visor 72 (the lower surface 61a). Accordingly, the sensor 51 is capable of monitoring the vehicle in a wider area, including the space in the vicinity of the rear seats, thereby enabling the detection sensitivity of the sensor 51 to be enhanced at a sufficiently high level. As a result, the user is able to immediately operate the alarm device 41, which is equipped with the sensor 51 having excellent detection sensitivity, by placing the alarm device 41 on the sun visor 72 using the mounting spring 62.

Furthermore, even if a receipt is inserted between the alarm device 41 and the sun visor, thereby causing the alarm device 41 to be covered by the receipt, the sensor 51 is mounted at angle θ toward the center of the alarm device 41 (the edge opposite to the sensor 51). As a result, the receipt does not cover the sensor 51, and therefore it is always maintained in the air-permeable state. Hence, the sensor 51 constituted by a sound pressure sensor can be always maintained in a detectable state.

While preferred embodiments have been shown and described, various modifications and substitutions may be made without departing from the spirit and scope of the invention. Accordingly, it is to be understood that the present invention has been described by way of examples, and not by limitations.

What is claimed is:

1. An alarm device comprising:
   a mounting surface in a first plane; and
   a sensor having a detection direction, wherein a second plane which faces and is parallel to the first plane is disposed in a predetermined position, wherein a plane perpendicular to the detection direction of said sensor is disposed at an angle of less than 90° with respect to said second plane.

2. An alarm device according to claim 1, wherein said sensor is a directional sound pressure sensor.

3. An alarm device according to claim 1, wherein said angle ranges from 60° to 80°.

4. An alarm device according to claim 1, wherein said angle is determined by subtracting from 90° an approximately mean value of a minimum angle and a maximum angle at which a sun visor disposed in an inside of a vehicle is set relative to a horizontal surface of a ceiling of said vehicle.

5. An alarm device system comprising:
   a sun visor having a visor surface parallel to the second plane; and
   the alarm device of claim 4 mounted on the sun visor so that the mounting surface of the alarm device contacts the visor surface.

* * * * *